United States Patent [19]

Kraft et al.

[11] 3,928,500

[45] Dec. 23, 1975

[54] PROCESSING AID FOR POLYVINYL CHLORIDE

[75] Inventors: Paul Kraft, Spring Valley; Adam F. Kopacki, Westwood; Robert Brunner, Yonkers, all of N.Y.

[73] Assignee: Stauffer Chemical Company, Westport, Conn.

[22] Filed: Aug. 14, 1973

[21] Appl. No.: 388,288

Related U.S. Application Data

[63] Continuation of Ser. No. 178,795, Sept. 8, 1971, abandoned, which is a continuation-in-part of Ser. No. 43,568, June 4, 1970, which is a continuation-in-part of Ser. No. 760,067, Sept. 16, 1968, abandoned.

[52] U.S. Cl. ...... 260/884; 260/17.4 R; 260/23 ED; 260/23 XA; 260/28.5 D; 260/45.7 P; 260/45.75; 260/45.75 R; 260/45.75 K; 260/45.8 NZ; 260/45.85; 260/836; 260/876 R; 260/878 R; 260/885

[51] Int. Cl.$^2$ ............... C08L 27/22; C08L 51/06; C08L 31/02; C08L 63/00

[58] Field of Search .................. 260/884, 876 R

[56] References Cited
UNITED STATES PATENTS

| 2,746,944 | 5/1956 | Naps et al. | 260/884 |
|---|---|---|---|
| 3,290,265 | 12/1966 | Kaneko et al. | 260/884 |
| 3,373,228 | 3/1968 | Glazer et al. | 260/884 |
| 3,504,053 | 3/1970 | Williams | 260/884 |
| 3,760,035 | 9/1973 | Kelley | 260/876 R |
| 3,764,638 | 10/1973 | Hwa et al. | 260/876 R |

FOREIGN PATENTS OR APPLICATIONS

| 1,015,334 | 12/1965 | United Kingdom | 260/884 |
|---|---|---|---|
| 1,062,308 | 3/1967 | United Kingdom | 260/884 |

*Primary Examiner*—Murray Tillman
*Assistant Examiner*—Thurman K. Page

[57] ABSTRACT

A process is disclosed for preparing a polyacrylate-modified polyvinyl chloride processing aid for polyvinyl chloride by sequentially polymerizing the vinyl chloride and the desired acrylate ester monomer. Thus, a conventional vinyl chloride suspension polymerization is conducted at a controlled rate of agitation and in the presence of a specified concentration of suspending agent and is then halted at or near its completion; unreacted vinyl chloride monomer is removed, a minor proportion of an acrylate ester monomer, e.g., methyl methacrylate, which has been pre-mixed with a fresh supply of a free radical initiating catalyst is added and polymerization is resumed and continued until the acrylate ester monomer polymerizes in and/or on the particles of the previously polymerized polyvinyl chloride. The polyacrylate-modified PVC thereby recovered is an effective aid for processing conventional PVC, or it can be processed per se since it is suitable for calendering or extruding.

22 Claims, No Drawings

PROCESSING AID FOR POLYVINYL CHLORIDE

RELATED APPLICATIONS

This application is a continuation of application Ser. No. 178,795 filed Sept. 8, 1971, now abandoned, which is, in turn a continuation-in-part of application Ser. No. 43,568, filed June 4, 1970, which is, in turn, a continuation-in-part of application Ser. No. 760,067, filed Sept. 16, 1968, now abandoned.

BACKGROUND OF THE INVENTION

When converting PVC, i.e., polyvinyl chloride, the resin ordinarily undergoes a fluxing step after which it is processed to its desired shape. It is, of course, necessary that the resin remain stable at the high temperatures which are encountered during these processing and fluxing procedures. Additionally, the resin must yield under stress, it must have adequate flow properties and it must lend itself to milling and extrusion. Since unmodified PVC does not always possess all of these properties, it has been necessary or desirable to add various processing aids to the resin. For instance, acrylic ester polymers in granular form are dry-mixed with the PVC resin and then milled on a calender or extruded. Alternatively, it is suggested by British patents, 1,062,308 and 1,015,334 that the vinyl chloride may be polymerized in the presence of the pre-formed acrylic ester polymer or the acrylic ester monomer may be added to the polyvinyl chloride latex and polymerized in situ. The resulting product is an emulsion grade polyvinyl chloride blended with the polyacrylate ester modifier. Such modified polymers and processing aids permit faster calendering with improved gloss, better surface qualities on extrusion, freedom from plating and other benefits.

In the above identified related patent application No. 760,067 there is disclosed a process for preparing processing aids for PVC by means of a process involving initiating the suspension polymerization of PVC, removing unreacted vinyl chloride monomer from the system after polymerization is at least 60% complete, introducing methyl methacrylate monomer into the system whereupon the polymerization is resumed and continued until the methyl methacrylate is polymerized.

However, since filing the latter patent application, it has been found that the products resulting from the polymerization process disclosed therein are somewhat deficient with respect to their melt flow properties, i.e, their fluidity characteristics, during subsequent processing operations such as molding.

Still another significant deficiency of the process disclosed in the above identified copending application is the absence of any means of controlling the size of the initially prepared PVC particles as well as of the particles of the polyacrylate-modified PVC derived therefrom. There was, moreover, no recognition given to the necessity for producing the desired processing aid in a certain particle size range. For example, if the processing aid particles are too large in size, their use in certain applications, such for example as in bottle blowing, will result in the preparation of products having a grain-like surface or so-called "applesauce" effect.

Thus, it is the prime object of this invention to provide an improved method for preparing a polyacrylate modified PVC processing aid. Still another object involves providing an efficient means for controlling both the size of the PVC particles prior to their modification with the subsequently added MMA, as well as the size of the polyacrylate-modified PVC particles derived therefrom. It is a further object to obtain these polyacrylate-modified PVC processing aids by means of a process which is at all times fully reproducible with respect to the properties inherent in the products derived therefrom. Various other objects and advantages of this invention will be apparent upon reading the disclosure which follows hereinafter.

TECHNICAL DISCLOSURE OF THE INVENTION

These and other objects are achieved by the process of this invention which broadly comprises suspension polymerizing vinyl chloride under conditions whereby polyvinyl chloride is obtained in a certain particle size range by means of a conventional, free radical initiated, suspension polymerization at a controlled rate of agitation and in the presence of a specified concentration of a suspending agent; removing unreacted vinyl chloride from the system after polymerization is at least 60% complete; adding to the system an effective concentration of a chain transfer agent and a minor proportion, i.e., up to about 50% by total solids weight of an acrylate ester monomer comprising methyl methacrylate and up to about 25% by its weight of one or more optional comonomers, as hereinafter defined, said monomer or monomers having first been pre-mixed with a fresh supply of an effective concentration of a monomer soluble, free radical catalyst; continuing the polymerization until the thus added methyl methacrylate, and any optional comonomers added therewith, are polymerized in and/or on the particles of the previously polymerized PVC; and, separating the polyacrylate-modified polyvinyl chloride thereby obtained. Apparently, the thus added acrylate ester monomer, i.e., the methyl methacrylate and any optional comonomers, are absorbed by and polymerized in and/or on the initially prepared polyvinyl chloride particles so as to thereby produce a polyacrylate-modified PVC resin which acts as an effective processing aid for blending with a polyvinyl chloride resin substrate or which can be processed per se without the addition of any other processing aid.

Moreover, it has been found that the utilization in the process of this invention, of:

1. The step of completely removing any unreacted vinyl chloride monomer prior to introducing and initiating the polymerization of the MMA and (2) the step of pre-mixing the MMA, and any optional monomers, with fresh catalyst as well as (3) the use of a chain transfer agent during the polymerization of the MMA all combine to contribute towards the attainment of a polyacrylate-modified polyvinyl chloride processing aid for PVC characterized by its excellent melt flow properties. Thus, these excellent melt flow properties appear to be directly attributable to the fact that the moieties derived from the methyl methacrylate, and from any optional comonomers which may also be present in the system, can be consistently obtained by means of this process whereas such products cannot ordinarily be prepared under conditions where (1) the unreacted vinyl chloride is not removed from the system; (2) the added catalyst is not pre-mixed with the MMA monomer and any optional monomers, prior to being introduced into the system; and (3) a chain transfer agent is not present in the system during the polymerization of the MMA and any optional comonomers.

Similarly, by controlling the rate of agitation and the concentration of the suspending agent that is present in the system during the initial polymerization of the PVC as well as during the subsequent polymerization of the acrylate ester monomer, it is now possible to readily control the size of the initially produced PVC particles, thereby greatly facilitating the absorption and the polymerization of the subsequently introduced MMA and any optional monomers. In the same manner, the size of the resulting polyacrylate-modified polyvinyl chloride particles is now readily maintained within the required limits so as to avoid producing them in too large a particle size thereby preventing "gell" or "fish-eye" or "grain-like" surface characteristics in the final PVC composition wherein these processing aid particles have been included.

According to the preferred embodiment of this invention, the acrylate ester monomer, i.e., the MMA and any optional monomers, is introduced into the system in a concentration of from about 20 – 100%, and preferably from about 25 – 66%, by weight, of the previously polymerized PVC. Thus, from about 10 – 60%, and preferably about 20 – 40%, by weight, of the resulting polyacrylate-modified polyvinyl chloride processing aid product will comprise moieties derived from the acrylate ester monomer, i.e. from the MMA and any optional monomers, while the polyvinyl chloride comprises from about 40 to 90%, and preferably about 60 – 80%, by weight, of the total weight of this product. It is important that the acrylate ester monomer which is employed should consist primarily of from about 80 to 100%, by weight, of methyl methacrylate (MMA) but, as a minor monomer ingredient together with the MMA, it is preferred that up to about 20% of the total acrylate ester monomer weight, or 25%, by weight, of the MMA, should comprise of one or more optional monomers.

In other words, the polyacrylate ester moieties of the novel polyacrylate modified processing aids of this invention may comprise polymethyl methacrylate or, more preferably, copolymers of methyl methacrylate with up to about 20%, by weight, of at least one ethylenically unsaturated, i.e. vinyl, comonomer. And, as previously noted, these polyacrylate ester moieties, which should preferably comprise a methyl methacrylate copolymer, are present in the process aid particles in a concentration of from about 10 – 60, and preferably about 20 – 40%, as based on the weight of the polyvinyl chloride moiety of the process aid particles.

The vinyl comonomers which can be used, together with methyl methacrylate, in forming the preferred polyacrylate ester moieties of these process aid particles may be selected from the group consisting of the $C_2$-$C_3$ alkyl methacrylates, e.g. ethyl, n-propyl and isopropyl methacrylate; the glycidyl esters of acrylic and methacrylic acid, e.g. glycidyl methacrylate and gly-cidyl acrylate; and, preferably, the $C_1$-$C_{12}$ alkyl acrylates wherein the alkyl group may be straight or branched, e.g. methyl, n-propyl, n-butyl, iso-butyl, tert-butyl, hexyl, 2-ethylhexyl, decyl and dodecyl acrylate; or, mixtures of any two or more of the latter optional monomers. Especially preferred is the polyacrylate-modified PVC process aid wherein the respective particles comprise about 70%, by weight, of polyvinyl chloride and about 30%, by weight, of a polyacrylace ester moiety which comprises a copolymer containing about 86%, by weight, of methyl methacrylate and 14%, by weight, of n-butyl acrylate.

It has been found that by adding the polyacrylate-modified polyvinyl chloride processing aids thus obtained to polyvinyl chloride resins in a concentration of from about 1 – 10%, by weight of the total mixture, the resultant compositions are easier to process than unmodified polyvinyl chloride. For example, when studied in a Brabender plastograph, the resulting easier processing resins are characterized by shortened flux times and higher shear torques. The polyacrylate-modified PVC processing aids which contain the preferred proportions of about 20 to 40 parts by weight MMA (with or without another optional monomer) to about 80 to 60 parts of polyvinyl chloride offer a substantial advantage over processing aids which are largely derived from acrylic polymers.

The process of this invention comprises adding the appropriate amount of acrylate ester monomer, comprising methyl methacrylate with or without one or more optional comonomers, to a previously polymerized, aqueous suspension of polyvinyl chloride, particularly PVC obtained by means of a suspension polymerization process. In conducting such a suspension polymerization process for the preparation of PVC, the vinyl chloride monomer, or a mixture of vinyl chloride with a minor proportion of an appropriate comonomer such as vinyl acetate or a lower alkyl acrylate, is admixed with a concentration of from about 0.01 to 5.0%, as based on the weight of the total monomer mixture, of a suspending agent such, for example, as methyl cellulose, hydroxyethyl cellulose, hydroxypropyl cellulose, carboxymethyl cellulose, talc, clay, polyvinyl alcohol, gelatine and the like. As has already been noted, the particle size of the resulting PVC particles has been found to be affected by the concentration of the suspending agent that is present in the system. Thus, it is necessary to utilize a concentration of the selected suspending agent which is within the above stated limits. For example, if the latter maximum limit for the concentration of the suspending agent is substantially exceeded, the resulting PVC particles will be well below the required particle size range which, as will be further discussed hereinbelow, is in the range of from about 5 to 150 microns. Conversely, if the lower limit of this range is not met, the resulting PVC particles will be far too large.

In addition, a monomer soluble, free radical catalyst or initiator such, for example as 2,2'-azobisisobutyronitrile, lauroyl peroxide, benzoyl peroxide or isopropylperoxy dicarbonate should be present in the system in a concentration of from about 0.01 to 3%, by weight, of the total monomer charge being utilized for the polymerization of the PVC or vinyl chloride copolymer.

Polymerization may then be initiated by heating the above described recipe at a temperature in the range of from about 20° to 90° C. and for a period of from about 3 to 15 hours with agitation being applied throughout the course of the reaction. As was discussed hereinabove, with respect to the concentration of the suspending agent, the rate at which agitation is applied during the polymerization of the PVC is still another significant process variable which affects the particle size of the resulting PVC particles. Thus, if insufficient agitation is applied, the PVC particles will be far too large.

As will be understood by those skilled in the art, the substantial number of variations in the size and configuration of the agitation apparatus and reaction vessels which can be utilized in polymerization processes makes it impossible to set forth a range for the rate of agitation that is required to be applied in conducting the polymerization of PVC a; the first step in the process of this invention. Accordingly, the agitation rate to be applied under any specific reaction conditions will be largely dependent upon such factors as the concentration of the suspending agent that is present in the system as well as on the design of the particular agitator, e.g. the shape of its blades, and reaction vessel, e.g. the number and design of its baffles, which are being utilized. Thus, the skill of the practitioner in the art will readily enable him to make what ever adjustments may be necessary in order to prepare the resulting PVC particles so that they are all substantially within the above given particle size range of from about 5 to 150 microns and, preferably, from about 25 to 80 microns.

The size of these PVC particles is a critical feature of the process of this invention. The reason is not entirely understood, but apparently the acrylate ester monomer, i.e., methyl methacrylate and any optional monomers, is somehow improperly absorbed by PVC particles which are substantially larger than the above stated maximum of 150 microns and it cannot, therefore, be effectively polymerized.

Similarly, as has already been noted, it is necessary that the particles size of the final product, i.e., of the polyacrylate-modified polyvinyl chloride processing aid, be within certain limits. Thus, it is necessary that they should range in size from a minimum of about 10 microns up to a maximum limit such that no more than about 15%, by weight, are larger than about 150 microns, A preferred range is from about 40 to 150 microns. Thus, if the particles of the processing aid are substantially smaller than the latter minimum size, it will be extremely difficult to isolate them with conventional plant equipment. Conversely, if the maximum limit for the size of these processing aid particles is substantially exceeded, "gels", "fish-eyes", and the above described "applesauce" effect will be imparted to the processed PVC compositions containing such oversized processing aid particles.

In order to be able to attain this desired particle size in the novel processing aids of this invention, it is necessary to utilize the step of pre-mixing the acrylate ester monomer, i.e., the MMA and any optional comonomers, with the fresh catalyst prior to adding either of the latter ingredients to the previously prepared PVC.

Polymerization of the subsequently added acrylate ester monomer is initiated by a standard monomer soluble, i.e., oil-soluble, free radical initiating catalyst. Suitable catalysts include, 2,2'-azobisisobutyronitrile, lauroyl peroxide, benzoyl peroxide, t-butyl peroxy pivalate and isopropylperoxy dicarbonate. As has already been noted, hereinabove, one of the novel aspects of the process of this invention relates to the fact that it is essential to pre-mix the additional free radical catalyst with the MMA, or with the MMA and any optional comonomers which are being utilized, prior to introducing either the catalyst or the MMA into the system in order to be able to attain a final product in which the MMA moieties have undergone the proper degree of conversion so as to result in the preparation of polyacrylate-modified PVC processing aids having suitable melt flow characteristics. Thus, if the catalyst is not pre-mixed with the MMA monomer, the previously prepared PVC particles will tend to absorb MMA and the catalyst in a non-uniform manner.

For example, some of the PVC particles will absorb MMA which is essentially catalyst free whereas other PVC particles will absorb MMA which will be extremely rich in catalyst. Since the molecular weight of polymethyl methacrylate moieties, or of the moieties comprising copolymers of MMA with the above described optional monomers, is largely governed by the catalyst concentration, it is clear that those PVC particles rich in catalyst will yield a final product which will contain polymethyl methacrylate moieties having a very low molecular weight whereas those PVC particles deficient in catalyst will yield a final product having polymethyl methacrylate moieties having a very high molecular weight. Moreover, the MMA absorbed in those PVC particles containing little or no catalyst will polymerize very slowly so that, within a prescribed polymerization cycle, some unpolymerized MMA will remain within the PVC particles of the final product. These conditions also make it difficult to obtain the final product within the desired particle size range. Needless to say, the above described conditions lead to poor product control along with variations in product performance since reproducible results cannot be achieved. However, this problem is completely obviated by the simple expedient of pre-mixing the catalyst with the MMA, and any optional comonomers, prior to adding either the MMA or the catalyst to the system containing the previously prepared PVC.

Chain transfer agents are used during the polymerization of the MMA, and any optional monomers, in order to further control the melt flow properties of the resulting acrylate modified PVC processing aids. These chain transfer agents, can be selected from the group consisting of:

1. chlorinated aliphatic hydrocarbons such as carbon tetrachloride, chloroform, methylene chloride, butyl chloride, methyl chloroform, propylene chloride and trichloroethylene;

2. aromatic hydrocarbons such as toluene, xylene, mesitylene, cumene, ethyl benzene, t-butyl benzene and chlorobenzene;

3. such as acetaldehyde, propionaldehyde, benzaldehyde and crotonaldehyde;

4. aliphatic and cyclic ketones such as methyl ethyl ketone, acetone, diethyl ketone, methyl isobutyl ketone and cyclohexanone methyl ethyl ketone;

5. cyclic ethers such as dioxane and tetrahydrofuran;

6. alkyl esters of aliphatic carboxylic acids such as methyl isobutyrate and ethyl acetate;

7. aliphatic alcohols such as sec-butyl alcohol, n-butyl alcohol, isobutyl alcohol and t-butyl alcohol;

8. aliphatic carboxylic acids such as acetic acid;

9. cyclic hydrocarbons such as methyl cyclohexane; and, most preferably 10. mono-di-and polymercaptans including monomer-captars such as methyl mercaptan; ethyl mercaptan; n- and t-butyl propyl mercaptan; n- and t-butyl mercaptan; n- and t-phentyl mercaptan; hexyl mercaptan; n- and t-heptyl mercaptan; n- and t-octymercaptan; n- and t-decyl mercaptan; n-dodecyl, i.e., lauryl, and t-dodecyl mercaptan; n- and t-tetradecyl mercaptan; n- and t-hexadecyl mercaptan; n- and t-octadecyl mercaptan; n- and t-eicosyl mercaptan; n- and t-pentacosyl mercaptan; n- and t-octacosyl mercaptan, n- and t-triconyl mercaptan and blends thereof. From this group of mono-mercaptans, it is preferred to use lauryl mercaptan.

Other operable monomercaptans include thiocetic acid; 1-mercapto-2-butanone; methyl mercaptoacetate; ethyl mercaptothioacetate; 1-mercapto-2-ethoxyethane; diethyl mercaptoethyl phosphorotrithioate; 2-mercaptoethyl acetamide; dimethyl aminomethyl mercaptan; cysteamine; mercaptomethylthiopropane; monomercaptocyclohexane; benzyl mercaptan; cysteine; and, mercaptoethanol.

Suitable dimercaptan chain transfer agents can be illustrated by ethanedithiol; 2,3 dimercaptopropanol; decanedithol1,10 and the like.

Suitable polymercaptan chain transfer agents having more than 3 mercaptan groups per molecule can be illustrated by pentaerythritol tetra(7-mercaptoheptanoate); mercaptoacetic acid triglyceride; pentaerythritol tri(beta-mercaptopropionate); pentaerythritol tetra(beta-mercaptopropionate); cellulose tri(alphamercaptoacetate ); 1,2,3-propane-trithiol; 1,2,3,4-neopentane tetrathiol; 1,2,3,4,5,6-mercaptopoly(ethyleneoxy)ethyl(sorbitol); 1,1,1-trimethyl propane tri(alpha-mercaptoacetate); dipentaerythritol hexa(3-mercaptopropionate); 1,2,3-tris(alpha-mercaptoacetypropane; thiopentaerythritol tetra(alpha-mercaptoacetate); 1,6,10-trimercaptocyclododecane, 1,2,3,4,5,6-hexamercaptocyclohexane; N,N', N''N'''-tetra(2-mercaptoethyl)pyromellitamide; tri-(2-mercaptoethyl )nitriolotriacetate; pentaerythritol tri(alpha-mercaptoacetate ); pentaerythritol tetra(alpha-mercaptoacetate); tri(p-mercaptomethylphenyl )methane; 2,2,7,7-tetrakis(mercaptomethyl)-4,5 dimercapto-octane; 5,5,5-tri(mercaptoethyl)phosphorotrithiote; xylitol penta(-beta-mercaptopropionate); and, the like.

Illustrative of low molecular weight polymeric materials having at least 3 pendant mercaptan groups per molecule are homopolymers and copolymers of vinyl thiol, e.g., polyvinyl thiol. Other polymeric thiols, such as glycerol/ethylene glycol polyether polymercaptan can also be used as chain transfer agents in the process of this invention.

From the above group, optimum results are, however obtained by the use of low molecular weight polymercaptans having from 3 - 5 mercaptan groups per molecule as illustrated by pentaerythritol tetrathioglycolate; pentacrythritol tetra(3-mercaptopropionate ); trimethylolethane tri(3-mercaptopropionate); xylitol penta(-beta-mercaptopropionate); trimethylolethane trithioglycolate trimethylolpropane tri(3-mercaptopropionate); and, trimethylolpropane trithioglycolate. The use of the latter polymercaptans are preferred since they are most efficient with respect to the rate of polymerization which is attainable in the system wherein they are utilized.

With respect to the amount of chain transfer which is used in the process of this invention, this will largely be determined by the particular chain transfer agent that is selected. However, in most instances they may be utilized in a concentration of from about 0.025-7.5%, as based on the total weight of the acrylate ester monomer charge, i.e., on the total weight of the MMA and any of the above identified optional monomers present in the monomer system. In general, mercaptans, and particularly polymercaptans, are more efficient and may be used in concentrations at the lower end of the latter range whereas less efficient chain transfer agents, such as the aromatic hydrocarbons, will be used in concentrations at the upper end of this range.

By utilizing a chain transfer agent in the process of this invention, it is possible to exercise a greater degree of control upon the molecular weight, i.e., to prevent the attainment of a molecular weight which is higher than the maximum value in the below state range, of that portion of the final polymeric product which is derived from the MMA and any optional comonomers which may have been introduced together therewith. This, in turn, affects the molecular weight of the product as a whole. Thus, it may be here stated that the products resulting from the process of this invention should, preferably, have a molecular weight, as expressed in terms of their Relative Viscosity, as determined in a 1%, by weight, solution of the polymer in cyclohexanone at 25° C., of from about 1.50 – 2.80 and, preferably, from about 2.30 – 2.60. Thus, it has been found that those products having a Relative Viscosity within this range will display optimum melt flow characteristics. As is know to those skilled in the art, Relative Viscosity is calculated by the use of the following formula: Relative Viscosity $=T_1/T_2$
where
$T_1=$ the time required for the passage of a standard volume of the polymer solution through an orifice in a viscometer and
$T_2=$ the time required for the passage of a standard volume of the solvent through the orifice in the identical viscometer.

The polymerization of the acrylate ester monomer, i.e., of the MMA and of any optional comonomers which may have been introduced into the system therewith, is conducted by heating the system, i.e., the selected chain transfer agent, the previously prepared PVC host polymer and the mixture of the catalyst with the MMA and any optional comonomers, at a temperature of from about 40° to 100° C. for a time sufficient to completely polymerize the MMA, and any optional comonomers, in and/or on the host PVC particles. It is to be pointed out that it is not ordinarily necessary to introduce any fresh suspending agent into the system since a sufficient quantity will already be present from the initial polymerization of the PVC.

The particular catalyst, temperature, reaction time and other operating conditions chosen are, of course, interdependent any may be those ordinarily employed in the polymerization of MMA. Other variations in polymerization technique will suggest themselves to those skilled in the art.

The process of this invention is particularly satisfactory when conducted with polyvinyl chloride homopolymers as the initially prepared vinyl chloride host polymer. However, as has already been briefly noted, there can also be employed the usual copolymers of vinyl chloride with minor proportions of one or more ethylenically unsaturated, i.e., vinyl, comonomers provided that the resulting vinyl chloride copolymers are within the above specified particle size and Relative Viscosity ranges. Similarly, the processing aids obtained by this process are especially desirable for incorporation in a substrate which may be polyvinyl chloride or a copolymer of vinyl chloride with one or more ethylenically unsaturated comonomers. Thus, for example, they provide excellent results with vinyl chloride:vinyl acetate copolymer which, as is well known, are especially different to calender.

Illustrative of these vinyl comonomers which can be used in preparing either the vinyl chloride host polymer of the novel processing aid of this invention or the vinyl chloride polymer substrates with which these processing aids may subsequently be blended include alpha-olefins such as ethylene, propylene and butylene; vinyl esters of carboxylic acids such as vinyl acetate, vinyl propionate, vinyl butyrate, and vinyl stearate; $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitrosubstituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$–$C_{20}$ mono- and dialkyl esters such as aconitic acid, fumaric acid, malcic acid, itaconic acid, citraconic acid, maleic anhydride, dibutyl fumarate and mono- diethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; vinyl pyrrolidones such as N-vinyl-2-pyrrolidone; $C_1$–$C_{20}$ alkyl vinyl ethers such as methyl vinyl ether, ethyl vinyl ether and stearyl vinyl ether; dienes such as isoprene and butadiene; and, glycidyl esters of acrylic and methacrylic acid such as glycidyl acrylate and glycidyl methacrylate, etc.

It is essential, in this process, that the PVC, or vinyl chloride copolymer, be first polymerized by the suspension technique until the reaction is at least 60% complete and preferably 80% or more complete. Unreacted vinyl chloride must then be removed when the system is vented before the MMA and any optional comonomers are subsequently added and polymerized. If this is not done, the remaining vinyl chloride monomer will undergo an undesirable copolymerization with the subsequently added MMA leading to non-reproducible results and to the preparation of a soft, rubbery product which often hardens before it can be removed from the reactor. This feature of sequential polymerization, i.e., of first polymerizing the vinyl chloride and then the MMA, is a unique and important aspect of this invention.

The acrylate ester polymerization, i.e., the polymerization of the MMA with or without one or more optional monomers, may be carried out in the same vessel immediately after the initial vinyl chloride suspension polymerization has been completed or the PVC may have been performed, i.e., previously polymerized, stored and used at a later date in carrying out this second step of the process. If the acrylate ester monomer polymerization is carried out in situ as soon as the original PVC polymerization system has been vented and unreacted monomer removed, then it may not be necessary to add any additional catalyst. However, if additional catalyst is used, it must, as has been stressed hereinabove, be pre-mixed with the MMA and any optional comonomers which are introduced therewith.

The compositions resulting from the admixture of PVC, or of a vinyl chloride copolymer substrate, with the polyacrylate-modified polyvinyl chloride processing aids of this invention can also include various optional additives or adjuncts which may include, for example:

Plasticizers such as the alkyl esters of phthalic, adipic and sebacic acids and aryl phosphate esters such, for example, as dioctyl phthalate, ditridecyl phthalate and tricresyl phosphate, etc.

Lubricants such as stearic acid and its barium, calcium and lead, salts, petroleum or paraffin based waxes, oils, low molecular weight polyethylene waxes, stearamides, montan wax, modified montan wax, synthetic waxes and stearic acid esters such as glyceryl monostearate, etc.

Pigments such as calcium carbonates, titanium dioxide, whiting, carbon black or any of the other pigments normally used in the processing of plastics.

Stabilizers which will protect the final formed product from the degradative effects of heat and light and which include phenyl salicylates; benzophenones; benzotriazoles; basic lead compounds such as dibasic lead phosphate, dibasic lead stearate, lead sulfate, lead chlorosilicate and dibasic lead phthalate; organo tin compounds such as dibutyl tin maleate, dibutyltin dilaurate, di(n-octyl) tin maleate polymer, n-butyl stannoic acid, thiollauric acids or its anhydride, dibutyltin lauryl mercaptide, dibutyltin isoctyl thioglycollate, dibutyltin mercaptopropionate and di(n-octyl) tin S,S'bis(isoctylmercaptoacetate); organic acid salts of barium, cadmium calcium or zinc such as barium 2-ethylhexoate, barium nonylphenate, cadmium 2-ethylhexoate, zinc 2-ethylhexoate and the laurates and stearates of barium, cadmium, calcium or zinc; polyols such as pentaerythritol and sorbital; nitrogen compounds such as melamine, benzoguanamine and dicyandiamide; epoxies such as epoxidized soya oil, epoxidized linseed oil, epoxidized tall oil esters and butyl and octyl epoxy stearate; organic phosphites such as diphenyldecyl phosphite, phenyl didecyl phosphite and trisnonylphenyl phosphite; and, liquid phenolics such as butylated hydroxytoluene, etc. For a more complete listing of plasticizers, lubricants, stabilizers and other functional additives, one may consult "Polyvinyl Chloride" by H. A. Sarvetnick published by Van Nostrand Reinhold Co., New York, N.Y. in 1969.

The compositions resulting from the admixture of PVC, or of a vinyl copolymer, with the polyacrylate-modified PVC processing aids of this invention may be utilized in any of the coating, impregnating and molding applications known to those skilled in the art. For example, these compositions may be used for preparing such diverse items as pipes, rods, tubes, siding, molded and extruded solids, profiles, calendered films, blow molded bottles and other containers, extruded flat bed and blown films and in carrying out such processes as extrusion, calendering, compression molding, blow molding, injection molding, fluidized bed coating, electrostatic powder spraying and rotational casting or molding, etc.

The following examples are given to illustrate this invention but not in any way to limit its scope. In these examples, all parts given are by weight unless otherwise noted.

EXAMPLE 1

Part 1

A 20 gallon Pfaudler reactor is charged with a standard recipe, as given below, for preparing suspension grade polyvinyl chloride. The polymerization is conducted at 60°C. for 5 ½ hours, with agitation being applied at a rate of about 300 rpm, resulting in the preparation of PVC particles having an average particle size of about 25– 50 microns:

|                                    | Parts                   |
|------------------------------------|-------------------------|
| Vinyl chloride                     | 221                     |
| Water                              | 234                     |
| Methyl cellulose                   | 50 (1% aqueous solution)|
| 2,2'-azobisisobutyronitrile (Catalyst) | 0.144               |

Part 2

When the reaction of Part 1, hereinabove, is essentially complete (80% – 85% conversion) all of the excess vinyl chloride monomer is vented off whereupon 0.09 parts lauryl mercaptan chain transfer agent followed by 90 parts of methyl methacrylate which has first been pre-mixed with 0.063 parts of additional 2,2'-azobisisobutyronitrile catalyst are added. Under agitation at a rate of 300 rpm, the polymerization is allowed to proceed at 75°C. until the MMA is polymerized in and/or on the host PVC particles (about 5 hours). The resulting product has a Relative Viscosity, as determined under the conditions described hereinabove of 2.00 and displays excellent melt flow properties when used as a processing aid for PVC. The particle size of this polyacrylatemodified PVC is such that no more than about 10.1%, by weight, is larger than about 150 microns.

EXAMPLE II

The procedure of Part 1 of Example I is repeated obtaining, in this instance, 210 parts by weight of suspension grade PVC, having a particle size between 50 and 80 microns, the PVC being suspended in 900 parts of water. After removing any unreacted vinyl chloride, there is subsequently added 0.20 parts of pentaerythritol tetrathioglycolate followed by 90 parts of MMA which has first been pre-mixed with 0.18 parts of lauryl peroxide. The monomer-catalyst mixture dissolves rapidly in the aqueous system while it is stirred and heated at 90°C. After 2 hours the MMA is polymerized in and/or on the host PVC polymer and the product analyses as 70% PVC: 24% PMMA. It has a Relative Viscosity of 1.90 as determined by the above described procedure, and a particle size such that no more than about 10%, by weight, of its particles are larger than about 150 microns. This material is an effective processing aid for polyvinyl chloride resin, displaying excellent melt flow properties at a concentration level only one-half the total acrylate ester level of a commercial all-acrylate processing aid. The latter is more expensive than this new 76:24 PVC:PMMA composition, since the acrylate monomer is three to four times more costly than vinyl chloride.

EXAMPLE III

The procedure of Example II is repeated. However, in this instance the 90 parts of weight of MMA and 0.02 parts of pentaerythritol tetrathioglycolate are replaced, respectively, with: (a) 5 parts of toluene and a mixture comprising 90%, by weight, of methyl methacrylate and 10%, by weight, of ethyl acrylate; (b) 2 parts of acetaldehyde and a mixture comprising 85%, by weight, of methyl methacrylate and 15%, by weight, of glycidyl methacrylate; and, (c) 3 parts of methyl ethyl ketone and a mixture comprising 80%, by weight, of methyl methacrylate and 20%, by weight, of ethyl methacrylate. Each of the latter monomer mixtures is first pre-mixed with 0.063 parts of 2,2'-azobisisobutyronitrile prior to being combined with the previously prepared PVC. In each instance the ultimate product has a Relative Viscosity of about 2.00, as determined by the above described procedure, and their respective particle size is such that no more than about 10%, by weight, is larger than about 150 microns. Each product displays excellent melt flow when incorporated in a rigid suspension PVC formulation at levels of 1 and 10% by weight and compared with a commercial all-acrylic processing aid at equal acrylic levels. Under standard milling conditions, the new products exhibit improved behavior both on the mill and in the finished sheets.

EXAMPLE IV

The procedure of Example I is repeated three times varying the amount of MMA, in each instance, so that the resulting products are: and 85:15 PVC:MMA polymer product, a 50:50 PVC:PMMA polymer product, and, an 80:20 PVC:PMMA polymer product. In each case, these products have a Relative Viscosity of about 2.10, as determined by means of the above described procedure and their particle size is such that no more than about 10%, by weight, are larger than about 150 microns. PVC compositions containing these processing aids display excellent melt flow characteristics.

EXAMPLE V

This example illustrates the criticality inherent in maintaining the particle size of the novel polyacrylate-modified processing aids of this invention within the above specified range of from about 10 microns up to a maximum limit such that not more than about 15%, by weight, are larger than about 150 microns.

Three repetitions of the polymerization procedure of Example I, hereinabove, are conducted in which the concentration of the methyl cellulose suspending agent and the rate of agitation during both Part 1 and Part 2 of the process are subjected to certain variations designed to affect the particle size of the resulting polyacrylate-modified PVC processing aid. Table 1, hereinbelow, describes the conditions used in preparing these different processing aid samples and provides detailed information with respect to their particle size.

Each of the various batches of the thus produced processing aids, including a sample of the product of Example I, are then dry blended with PVC so as to yield compositions each of which contain 5%, by weight, of the respective processing aids. These compositions are then converted, via a fluxing and screening process, into 50 mil rigid sheets using a two-roll mill operating at 177°– 185° C. and a sheer ratio of 1.0:1.4.

The homogeneity, clarity and surface texture of the resulting sheets is then evaluated. Table 2, hereinbelow, describes the results of these various evaluations.

TABLE 1

| Processing Aid No. | Rate of Agitation During Polymerization(rpm) | Conc. of Suspending Agent (% by weight of Vinyl Chloride) | %, by Weight of Particles Having Particles Size Of: | | | | | | | % By Weight, Particles Greater Than 150 μ |
|---|---|---|---|---|---|---|---|---|---|---|
| | | | 420μ | 250μ | 177μ | 149μ | 105μ | 74μ | 44μ | |
| 1* | 300 | 0.236 | 0.4 | 1.4 | 8.3 | 21.0 | 44.4 | 15.5 | 10.1 | 10.1 |
| 2 | 300 | 0.460 | 0.5 | 0.5 | 0.9 | 29.5 | 6.1 | 50.6 | 13.0 | 1.9 |
| 3 | 600 | 0.460 | 0.1 | 0.8 | 0.4 | 0.2 | 8.1 | 65.0 | 25.4 | 1.3 |
| 4 | 300 | 0.118 | 3.8 | 15.8 | 29.9 | 39.3 | 9.5 | 1.5 | 0.5 | 49.5 |

* The processing aid whose preparation is described in Example I.

TABLE 2

| Processing Aid No. Used In Sheet | Characteristics of the Milled Sheets | | |
|---|---|---|---|
| | Homogeneity | Clarity | Surface Texture |
| 1 | Good | Good | Fair |
| 2 | Good | Good | Good |
| 3 | Excellent | Excellent | Good |
| 4 | Fair | Poor | Poor - Characterized by "Applesauce effect" |

The above data clearly reveals that the use, in the preparation of PVC compositions, of polyacrylate-modified processing aids having a particle size such that more than about 15%, by weight, are larger than 150 microns, as in the sheet made with processing aid No. 4, is highly unsatisfactory with respect to a number of significant properties displayed by the resulting composition.

EXAMPLE VI

This example illustrates the importance, in the process of this invention, of removing al of the unreacted vinyl chloride prior to the subsequent addition and polymerization of the MMA.

these conditions, the unreacted vinyl chloride copolymerizes with the MMA.

EXAMPLE VII

This example illustrates the importance, in the process of this invention, of pre-mixing the MMA monomer with additional catalyst prior to admixing either of the latter materials with the previously polymerized PVC.

A number of repetitions of the basic polymerization procedure of Example I are conducted. In some instances, however, the MMA is not pre-mixed with the 2,2'-azobisisobutyronitrile catalyst but the monomer and catalyst are, instead, individually added to the previously prepared PVC. Moreover, in those polymerization runs in which the catalyst and the methyl methacrylate are not pre-mixed, the concentration of the lauryl mercaptan chain transfer agent is varied between about 0.05 – 0.75%, by weight of the MMA.

The following table describes the products resulting from these various polymerization runs with respect to their Relative Viscosity; the percent PMMA, i.e., polymethyl methacrylate present therein; and, the percentage by weight of the particles of the final product which passes through a 140 mesh screen U.S. Standard Sieve Series.

| Run No. | % Lauryl Mercaptan Chain Transfer Agent | Mode of Addition of The MMA & Catalyst | Relative Viscosity of Final Product | % PMMA In Final Product | % By Weight of Particles Passing Thru 140 Mesh |
|---|---|---|---|---|---|
| 1 | 0.05 | MMA & Catalyst Added Separately | 2.11 | 27 | 42.0 |
| 2 | 0.1 | '' | 1.95 | 29 | 69.0 |
| 3 | 0.2 | '' | 2.03 | 31.5 | 77.0 |
| 4 | 0.5 | '' | 1.96 | 30 | 73.0 |
| 5 | 0.75 | '' | 2.49 | 31 | 33.0 |
| 6 | 0.1 | Catalyst & MMA Added as a premixed Solution | 2.10 | 30.3 | 50.1 |
| 7 | 0.1 | '' | 2.11 | 30.3 | 52.0 |
| 8 | 0.1 | '' | 2.16 | 30.5 | 51.6 |
| 9 | 0.1 | '' | 2.14 | 30.5 | 49.5 |

The procedure of Example I is repeated in all of its details. However, in this instance, any unreacted vinyl chloride monomer which is present after the initial polymerization is not vented off prior to adding and thereupon polymerizing the MMA. Under these conditions the reaction mass is observed to set-up, i.e., to coagulate, so that it prevents the preparation of the desired polyacrylate modified polyvinyl chloride processing aid.

In still another attempt to conduct this process without removing the unreacted vinyl chloride monomer, it is possible to avoid coagulation within the reactor. However, the resulting processing aid is found to provide poor results when blended with PVC since, under The data presented in the above table reveals that the respective products resulting from those polymerization runs, i.e., Nos. 1 – 5, in which the MMA and catalyst are not pre-mixed prior to being added to the previously polymerized PVC exhibit highly inconsistent properties. These inconsistent properties are indicative of the non-reproducible results which characterize the process when it is carried out in this manner.

More particularly, it is seen that the percent, by weight, of the particles of the final product passing through a 140 mesh screen varies from 33 – 77%, while in those products made by a procedure involving the pre-mixing of catalyst and MMA, i.e., runs Nos. 6 – 9, the percent by weight passing through a 140 mesh screen varies only from 49.5 – 52.0%. Similarly, the percent PMMA in the products resulting from runs Nos. 1 – 5 varies from 27 – 31.5% whereas the percent PMMA in the final products resulting from runs Nos. 6 – 9 varies only from 30.3 – 30.5%.

With respect to the molecular weight of these products, as expressed in terms of their Relative Viscosity, it is seen that the products resulting from runs Nos. 1 – 5 have Relative Viscosity values ranging from 1.95 – 2.49. Moreover, it is interesting to note that the Relative Viscosity of a polymer ordinarily drops as the concentration of chain transfer agent that is present during its preparation is increased. In the above tabulated results, however, it is seen that in some cases the Relative Viscosity values of the final product actually increases as the concentration of the chain transfer agent is raised. By contrast, the Relative Viscosity values of the products of runs Nos. 6–9 varies only from 2.10–2.16.

EXAMPLE VIII

This example illustrates the necessity, in the process of this invention, for the presence of a chain transfer agent during the polymerization of the acrylate ester monomer.

The procedure of Example I is again repeated with the exception, in this instance, that the lauryl mercaptan chain transfer agent was not utilized during the polymerization of the methyl methacrylate. The resulting product is found to have a very high Relative Viscosity which is substantially above the stated maximum limit of 2.80. As a result, when this product is used as a processing aid for PVC, the resulting composition is found to yield flexible films and blown bottles which have a rather poor, grainy surface.

EXAMPLE IX

This example illustrates the preparation of one of the preferred polyacrylate-modified PVC processing aids of this invention.

Part 1

A 20 gallon Pfaudler reactor is charged with a standard recipe, as given below, for preparing suspension grade polyvinyl chloride. The polymerization is conducted at 60°C. for 5½ hours, with agitation being applied at a rate of about 300 rpm, resulting in the preparation of PVC particles having an average particle size of about 25 – 30 microns:

|  | Parts |
| --- | --- |
| Vinyl Chloride | 221 |
| Water | 234 |
| Methyl Cellulose | 50 (1% aqueous solution) |
| 2,2'-azobisisobutyronitrile (Catalyst) | 0.144 |

Part 2 when the reaction of Part 1, hereinabove, is essentially complete, i.e., about 80 – 85% conversion, all of the excess vinyl chloride monomer is vented off whereupon 0.027 parts of lauryl mercaptan chain transfer agent followed by a mixture of 77.4 parts of methyl methacrylate, i.e., MMA, and 12.6 parts of n-butyl acrylate which has first been pre-mixed with 0.063 parts of additional 2,2'-azobisisobutyronitrile catalyst, are added. Under agitation at a rate of 300 rpm, the polymerization is allowed to proceed for about 5 hours at 75°C. until the MMA is polymerized in and/or on the host PVC particles. The resulting product, which comprises particles containing about 70%, by weight, of PVC and about 30% by weight, of a polyacrylate moiety comprising about an 86:14 methyl methacrylate:n-butyl acrylate copolymer, has a Relative Viscosity as determined under the conditions described hereinabove, of about 2.50. The particle size of this polyacrylate-modified PVC process aid is such that no more than about 10.1%, by weight, is larger than about 150 microns.

EXAMPLE X

This example illustrates the use of the product of Example IX, hereinabove, in preparing a mixture with a PVC resin substrate which is then subjected to an extrusion operation.

In this procedure, 100 parts of suspension grade polyvinyl chloride resin granules are introduced into a Welex high speed, intensive mixer whose impeller speed is gradually increased up to 3,000 rpm which results in a temperature rise of about 3°– 6°F. per minute within the resin mass. When the temperature of the resin is at about 140°F., 2.0 parts of an organo tin mercaptide stabilizer sold as "Thermolite 31 " by M & T Chemicals, Inc. are added to the resin. Under continued agitation, the temperature of the mixture is raised to about 170°– 175°F. at which point 2.0 parts of calcium stearate and 0.1 parts of low molecular weight polyethylene wax, sold by the Allied Chemical Co. as "PE-629 A" are added. Next, the temperature of the mixture is allowed to rise to about 215°F. whereupon 1.0 parts of titanium dioxide is added. Upon reducing the rate of agitation and applying external cooling, the temperature of the mixture is reduced to about 100°F. at which point 3.0 parts of the process aid particles whose preparation is described in Example IX, hereinabove, are introduced.

The resulting mixture is then blended, for 10 minutes, at a low rate of agitation and with external cooling whereupon it is removed from the mixer. It is then extruded in a one inch extruder fitted with a multiple hole rod die with the extruder operating at 10 – 60 rpm at a stock temperature of about 390°– 400°F. The result of this extrusion operation is a plurality of rod shaped products having a circular cross section with a diameter of 1/16 of an inch. Upon examining these rods, their surface is found to be exceedingly smooth and glossy.

Variations may be made in proportions, procedures and materials without departing from the scope of this invention as defined by the following claims.

What is claimed is:

1. A process for the preparation of a polyacrylate-modified polyvinyl chloride processing aid which consists essentially of: (1) first preparing particles of polyvinyl chloride by suspension polymerizing vinyl chloride monomer in the presence of from about 0.01 to 5%, by weight, of the vinyl chloride monomer, of a suspending agent with agitation being applied to the system, said particles having a particle size in the range of from 5–150 microns; (2) removing unreacted vinyl chloride monomer from the system after polymerization of the vinyl chloride is at least about 60% complete; (3) adding to the suspension of polyvinyl chloride particles resulting from step (1) an effective concentration of a chain transfer agent and a solution of (a) an acrylate ester monomer selected from the group consisting of methyl methacrylate and mixtures of methyl methacrylate together with from about 20 to 0%, by weight, of one or more ethylenically unsaturated comonomers and (b) an effective concentration of at least one free radical initiating catalyst which is soluble in said acrylate ester monomer; said solution of acrylate ester monomer and catalyst having been premixed prior to its addition to said suspension of polyvinyl chloride; said acrylate ester monomer being added to the system in a total amount to provide between about 20–100% of monomer, by weight of the polyvinyl chloride resulting from step (1); (4) suspension polymerizing the acrylate ester monomer in the presence of the mixture resulting from step (3) while applying agitation; and (5) recovering the particles of polyacrylate-modified polyvinyl chloride resulting from step (4); said particles of polyacrylate-modified polyvinyl chloride resulting from step (4) having a particle size in the range of from about 10 microns up to a maximum limit such that no more than about 15%, by weight are larger than about 150 microns; said particles of polyacrylate-modified polyvinyl chloride comprising particles of polyvinyl chloride having polyacrylate ester moieties in and/or on said polyvinyl chloride particles, said particles having a Relative Viscosity of from about 1.50–2.80 when determined, at 25° C., with a 1% solution of the polymer in cyclohexanone.

2. The process of claim 1, wherein said ethylenically unsaturated monomer which is introduced into the system in step (3) along with said methyl methacrylate, is selected from the group consisting of the $C_2$–$C_3$ alkyl methacrylates, the $C_1$–$C_{12}$ alkyl acrylates, the glycidyl esters of acrylic and methacrylic acid and mixtures of the latter monomers.

3. The process of claim 1, wherein the proportion of acrylate ester monomer which is introduced into the system in step (3) is from about 25 – 66%, by weight, of the polyvinyl chloride resulting from step (1).

4. The process of claim 1, wherein the acrylate ester monomer which is introduced into the system in step (3) comprises methyl methacrylate.

5. The process of claim 1, wherein the remaining vinyl chloride monomer is removed in step (2) after polymerization of the polyvinyl chloride in step (1) is about 80% complete.

6. The process of claim 1, wherein said chain transfer agent is selected from the group consisting of chlorinated aliphatic hydrocarbons; aromatic hydrocarbons; aldehydes; aliphatic and cyclic ketones; cyclic ethers; alkyl esters of aliphatic carboxylic acids; aliphatic alcohols; aliphatic carboxylic acids; cyclic hydrocarbons; mono- di- and polymercaptans; and, mixtures thereof.

7. The process of claim 6, wherein said chain transfer agent is a mono-mercaptan.

8. The process of claim 7, wherein said chain transfer agent is lauryl mercaptan.

9. The process of claim 1; wherein the polyvinyl chloride resulting from step (1) has a particle size in the range of from about 25 to 80 microns.

10. The process of claim 1, wherein the particles of said polyacrylate-modified polyvinyl chloride processing aid resulting from step (4) have a particle size in the range of from about 40 150 microns.

11. The process of claim 1, wherein the acrylate ester monomer which is introduced into the system in step (3) comprises a mixture of methyl methacrylate and a $C_1$–$C_{12}$ alkyl acrylate.

12. The process of claim 11, wherein said $C_1$–$C_{12}$ alkyl acrylate comprises n-butyl acrylate.

13. The process of claim 12, wherein the acrylate ester monomer which is added to the system in step (3) comprises a mixture of about 84%, by weight, of methyl methacrylate and about 16%, by weight, of n-butyl) acrylate.

14. The process of claim 1, wherein said particles resulting from step (4) comprise about 70%, by weight, of polyvinyl chloride and about 30%, by weight, of polyacrylate ester moieties which comprise a copolymer of about 84%, by weight, of methyl methacrylate and about 16%, by weight, of n-butyl acrylate.

15. A polyacrylate-modified polyvinyl chloride processing aid comprising particles of polyvinyl chloride having polyacrylate ester moieties polymerized in and/or on said particles; said polyacrylate ester moieties being selected from the group consisting of polymethyl methacrylate and copolymers of methyl methacrylate with up to about 20%, by weight, of at least one ethylenically unsaturated comonomer; said polyacrylate ester moieties being present in a concentration of from about 10 to 60% as based on the weight of the polyvinyl chloride moieties of said particles; said processing aid having a Relative VIscosity of from about 1.50–2.80 when determined, at 25°C., with a 1% solution of the polymer in cyclohexanone, and a particle size in the range of from about 10 microns up to a maximum limit such that no more than about 15%, by weight, are larger than about 150 microns.

16. The polyacrylate-modified polyvinyl chloride processing aid of claim 15, wherein the polyacrylate ester moieties of said particles are selected from the group consisting of copolymers of methyl methacrylate with up to 20%, by weight, of at least one ethylenically unsaturated comonomer selected from the group consisting of the $C_1$–$C_{12}$ alkyl acrylates, the $C_2$–$C_3$ alkyl methacrylates, the glycidyl esters of acrylic and methacrylic acid and mixtures of the latter copolymers.

17. The polyacrylate-modified polyvinyl chloride processing aid of claim 15, wherein the polyacrylate ester moieties of said particles comprise polymethyl methacrylate.

18. The polyacrylate-modified polyvinyl chloride processing aid of claim 15, wherein the polyacrylate ester moieties of said particles comprise a copolymer of methyl methacrylate with a $C_1$–$C_{12}$ alkyl acrylate.

19. The processing aid of claim 18, wherein said $C_1$–$C_{12}$ alkyl acrylate comprises n-butyl acrylate.

20. The polyacrylate-modified polyvinyl chloride processing aid of claim 19, wherein the polyacrylate ester moieties of said particles comprise a copolymer of about 84%, by weight, of methyl methacrylate with about 16%, by weight, of n-butyl acrylate.

21. The processing aid of claim 20, wherein said particles comprise about 70%, by weight, of polyvinyl chloride moieties and about 30%, by weight, of polyacrylate ester moieties which comprise a copolymer of about 84%, by weight, of methyl methacrylate and about 16%, by weight, of n-butyl acrylate.

22. The polyacrylate-modified polyvinyl chloride processing aid of claim 15, wherein said particles have a particle size in the range of from about 40 to 150 microns.

* * * * *

UNITED STATES PATENT AND TRADEMARK OFFICE
CERTIFICATE OF CORRECTION

PATENT NO. : 3,928,500
DATED : December 23, 1975
INVENTOR(S) : Paul Kraft et al.

It is certified that error appears in the above—identified patent and that said Letters Patent are hereby corrected as shown below:

Col. 5, line 5, "PVC a," should be -- PVC as --;

Col. 5, lines 34-35, "micros," should be -- microns. --;

Col. 6, line 45, "such as" should be -- aldehydes such as--;

Col. 8, line 19, "know" should be -- known --;

Col. 11, line 47, change "70%" to -- 76% --;

Col. 12, line 27, "and" before "85:15" should be -- an --; and

Col. 13, line 35, change "al" to -- all --.

Signed and Sealed this

First Day of February 1977

[SEAL]

Attest:

RUTH C. MASON
Attesting Officer

C. MARSHALL DANN
Commissioner of Patents and Trademarks